United States Patent
Axelsson et al.

(10) Patent No.: US 8,499,559 B2
(45) Date of Patent: Aug. 6, 2013

(54) TWO-STAGE TURBO-CHARGER ENGINE SYSTEM

(75) Inventors: Pal Axelsson, Sodertalje (SE); Hans Drangel, Stockholm (SE); Björn Lind, Haninge (SE)

(73) Assignee: GM Global Technology Operations LLC, Detroit, MI (US)

( * ) Notice: Subject to any disclaimer, the term of this patent is extended or adjusted under 35 U.S.C. 154(b) by 670 days.

(21) Appl. No.: 12/294,853

(22) PCT Filed: Mar. 22, 2007

(86) PCT No.: PCT/EP2007/002531
§ 371 (c)(1),
(2), (4) Date: Oct. 15, 2010

(87) PCT Pub. No.: WO2007/115659
PCT Pub. Date: Oct. 18, 2007

(65) Prior Publication Data
US 2011/0020108 A1    Jan. 27, 2011

(30) Foreign Application Priority Data
Apr. 5, 2006 (EP) .................................... 06007228

(51) Int. Cl.
*F02B 33/44* (2006.01)
*F02B 33/00* (2006.01)
*F02B 37/013* (2006.01)

(52) U.S. Cl.
USPC .......................................... 60/612; 123/562

(58) Field of Classification Search
USPC .......................................... 60/612; 123/562

IPC ........................................................ F02B 37/013
See application file for complete search history.

(56) References Cited

U.S. PATENT DOCUMENTS

| | | | |
|---|---|---|---|
| 4,930,315 A | 6/1990 | Kanesaka | 60/612 |
| 5,408,979 A | 4/1995 | Backlund et al. | 60/612 |
| 6,802,184 B2 * | 10/2004 | Huter et al. | 60/612 |
| 7,302,800 B2 * | 12/2007 | Klingel | 60/612 |
| 2008/0178591 A1 * | 7/2008 | Axelsson et al. | 60/602 |
| 2011/0041497 A1 * | 2/2011 | Cavallo et al. | 60/612 |
| 2011/0123315 A1 * | 5/2011 | Robinson | 415/145 |

FOREIGN PATENT DOCUMENTS

| | | |
|---|---|---|
| DE | 4331943 A1 | 3/1995 |
| DE | 10230934 A1 | 1/2004 |

(Continued)

OTHER PUBLICATIONS

International Searching Authority, International Search Report for Application No. PCT/EP2007/002531, dated Jul. 6, 2007.

*Primary Examiner* — Thai Ba Trieu
(74) *Attorney, Agent, or Firm* — Ingrassia Fisher & Lorenz, P.C.

(57) ABSTRACT

A turbine housing for a high-pressure turbo-charger of a turbo-charger engine system for an internal combustion engine is provided that includes, but is not limited to a low-pressure charger opening for taking up a low-pressure turbo-charger and a high-pressure charger opening for taking up a high-pressure turbo-charger. A high-pressure exhaust opening is attached to a corresponding flange at an exhaust manifold of the engine and there is a short-cut exhaust opening with a high-pressure turbine by-pass valve area attached to a corresponding flange at the exhaust manifold. An external connection opening is attached to a muffler, a waste gate valve area being provided in the close vicinity of the external connection opening.

10 Claims, 8 Drawing Sheets

FOREIGN PATENT DOCUMENTS

| | | | |
|---|---|---|---|
| FR | 2918710 | A1 | 1/2009 |
| GB | 2488136 | A * | 8/2012 |
| JP | 2005120937 | A * | 5/2005 |
| JP | 2005133651 | A * | 5/2005 |
| JP | 2010261362 | A * | 11/2010 |
| WO | 2009129894 | A1 | 10/2009 |
| WO | 2011060914 | A1 | 5/2011 |

* cited by examiner

TWO-STAGE TURBO-CHARGER ENGINE SYSTEM

CROSS-REFERENCE TO RELATED APPLICATIONS

This application is a U.S. National-Stage entry under 35 U.S.C. §371 based on International Application No. PCT/EP2007/002531, filed Mar. 22, 2007, which was published under PCT Article 21(2) and which claims priority to European Application No. 06007228.7, filed Apr. 5, 2006, which are all hereby incorporated in their entirety by reference.

TECHNICAL FIELD

The technical field relates to a two-stage turbo-charger engine system for an internal combustion engine.

BACKGROUND

A two-stage turbo-charger engine system is disclosed in U.S. Pat. No. 4,930,315. This turbo-charger system is limited insofar as it is difficult to provide a diesel particle filter. Normally, one would provide an oxidation catalyst close to the engine and an under floor diesel particle filter. A vehicle equipped with such an engine has an unnecessary low performance and loss of heat when the DPF is regenerated. A two-stage switchable turbocharger is also known from DE 102 30 934 A1. Each turbine has a controllable bypass which is provided with a waste-gate valve.

It is at least one object of the invention to provide a vehicle with a clean and powerful engine within current vehicle platform architectures. In addition, other objects, desirable features, and characteristics will become apparent from the subsequent summary and detailed description and the appended claims, taken in conjunction with the accompanying drawings and this background.

SUMMARY

An embodiment of the invention provides a turbo-charger engine system for an internal combustion engine. A turbine housing for the turbo-charger comprises a low-pressure charger opening for taking a low-pressure turbo-charger and a high-pressure charger opening for taking up a high-pressure turbo-charger. The low-pressure charger opening and high-pressure charger opening communicate via a low-pressure exhaust duct, so that flow and pressure coming from a high-pressure turbine actuates a low-pressure turbine.

Further, there is a high-pressure exhaust opening provided, the high-pressure exhaust opening communicating via a high-pressure exhaust duct with the high-pressure charger opening, the high-pressure exhaust opening being attachable to a corresponding flange at an exhaust manifold of the engine, such that flow and pressure from the exhaust manifold of the engine actuates a high-pressure turbine.

There is also a short-cut exhaust opening provided, the short-cut exhaust opening communicating via a short-cut duct with the low-pressure charger opening. The short-cut exhaust opening is attached to a corresponding flange at the exhaust manifold of the engine, such that flow and pressure from the exhaust manifold of the engine actuates a low-pressure turbine. A high-pressure turbine by-pass valve is located in the short-cut duct which influences how flow from the exhaust manifold of the engine is led to the low-pressure turbine.

The turbine housing comprises an external connection opening being attached to a muffler. The external connection opening communicates with the low-pressure charger such that flow and pressure from the low-pressure turbine is led to the exhaust after treatment system and muffler.

The external connection opening further communicates with the low-pressure exhaust duct via a low-pressure exhaust bypass duct such that flow and pressure from the low-pressure exhaust duct is led to the muffler, too. A waste gate valve area is provided in the low-pressure exhaust bypass duct which influences how the flow from the low-pressure exhaust duct is led to the muffler.

It is one major advantage of such a design that the exhausts can be routed from the exhaust manifold to both the high-pressure stage turbine as well as directly into the low-pressure stage turbine. The exhausts exiting the high-pressure turbine can also be directed back into the low-pressure turbine. At the same time, the same connection between the high-pressure turbine and the low-pressure turbine can be used as a waste gate channel, when the system is operated under different conditions.

Even further advantageously, according to a preferred embodiment of the invention, the turbine housing according to the invention is equipped with a low-pressure turbo-charger with a low-pressure turbine wheel being located in the low-pressure charger opening and with a high-pressure turbo-charger with a high-pressure turbine wheel being located in the high-pressure charger opening. The low-pressure turbine wheel and the high-pressure turbine wheel are facing towards each other. This enables a compact and light weight design of the turbo-charger engine system according to the invention and therefore the use of a close-coupled diesel particle filter, especially when the high-pressure exhaust flange and the short-cut exhaust flange lie essentially in parallel or in the same planes. Such a close-coupled diesel particle filter is less expensive than a separate catalyst combined with an under floor diesel particle filter. The shorter distance between the turbo system outlet and the DPF means that—compared to a distant under-floor DPF—higher temperature in the DPF of the invention will be obtained which improves its performance. It has also a lower pressure drop which means that higher performance can be achieved, which is important when the internal combustion engine according to the invention is mounted into a vehicle with the external connection opening being attached to a muffler section of the vehicle.

Another advantageous embodiment of the invention provides the low-pressure exhaust duct, the high-pressure exhaust duct, the short-cut duct and/or the low-pressure exhaust bypass duct as internal channels in the turbine housing. Once the invention is implemented, this can easily be achieved, especially by providing the turbine housing as a single cast piece. Such compact integrated turbine housing has a lower amount of expensive high temperature material. Due to the lower amount of parts and joints, the risk of leakage is reduced and hence higher quality and lower costs are achieved. Moreover, such turbine housing provides easy and simple access for machining the turbine wheel contours through the openings in the casting.

It turned out that the waste gate valve area is easily accessible for a machining process from outside of the turbine housing when the waste gate valve area is located in the vicinity of the external connection opening. This helps to reduce the production costs of the turbo-charger engine system according to this invention.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any theory presented in the preceding summary and background or the following detailed description.

Figure 1:
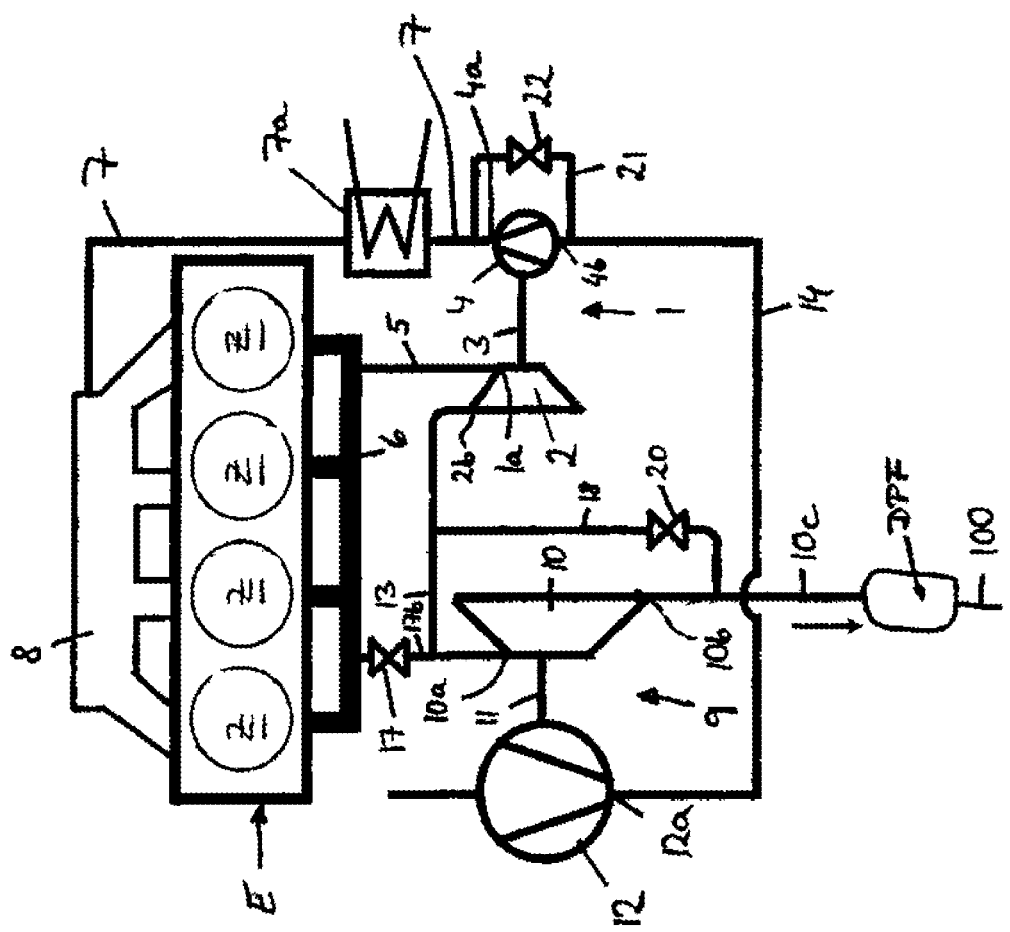
FIG. 1 is the entire schematic of a turbo-charger engine system according to an embodiment of the invention.

FIG. 1 illustrates the structure of one example of a turbo-charger engine system according to an embodiment of the invention. The turbo-charger engine system comprises engine E with four cylinders Z, with high-pressure turbo-charger 1, with low-pressure turbo-charger 9 and with diesel particle filter DPF. For the sake of clarity, further parts of the engine E are left away in FIG. 1.

The high-pressure turbo-charger 1 includes a high-pressure turbine 2 and a high-pressure compressor 4 being driven by high-pressure turbine 2 via shaft 3. The high-pressure turbine inlet 1a communicatively connected to the exhaust manifold 6 of the engine E via high-pressure exhaust pipe 5 which is also called high-pressure turbine connection pipe. The high-pressure compressor outlet 4a communicates with an intake manifold 8 of the engine E via a high-pressure charging pipe 7. The intercooler 7a is provided in the high-pressure charging pipe 7.

The low-pressure turbo-charger 9 includes a turbine 10 and a compressor 12 being driven and rotated, respectively, by low-pressure turbine 10 via a shaft 11. Low-pressure turbine inlet 10a communicates with high-pressure turbine outlet 2b of high-pressure turbo charger 1 via low-pressure exhaust pipe 13, which is also called high pressure turbine exhaust pipe 13. The exhaust manifold 6 directly communicates with the low-pressure turbine inlet 10a via a short-cut pipe or bypass 17a (not shown in FIG. 1). The short-cut pipe 17a comprises a high-pressure turbine by-pass valve 17. The low-pressure compressor outlet 12a communicates with high-pressure compressor inlet 4b of high-pressure turbo-charger 1 via low-pressure charging pipe 14.

The low-pressure turbine outlet 10b is connected with the diesel particle filter DPF via a connection pipe section 10c. The diesel particle filter DPF is connected with a muffler pipe 100.

The high pressure turbine exhaust pipe 13 communicates with the low-pressure turbine outlet 10b via low-pressure turbine exhaust bypass 18 which has a waste gate valve 20.

The low-pressure charging pipe 14 communicates with the high-pressure charging pipe 7 via charging bypass 21. The charging bypass 21 has a check valve 22. Check valve 22 has a function of allowing a flow from low-pressure charging pipe 14 to high-pressure charging pipe 7 but prevents a reverse flow.

Figure 2:
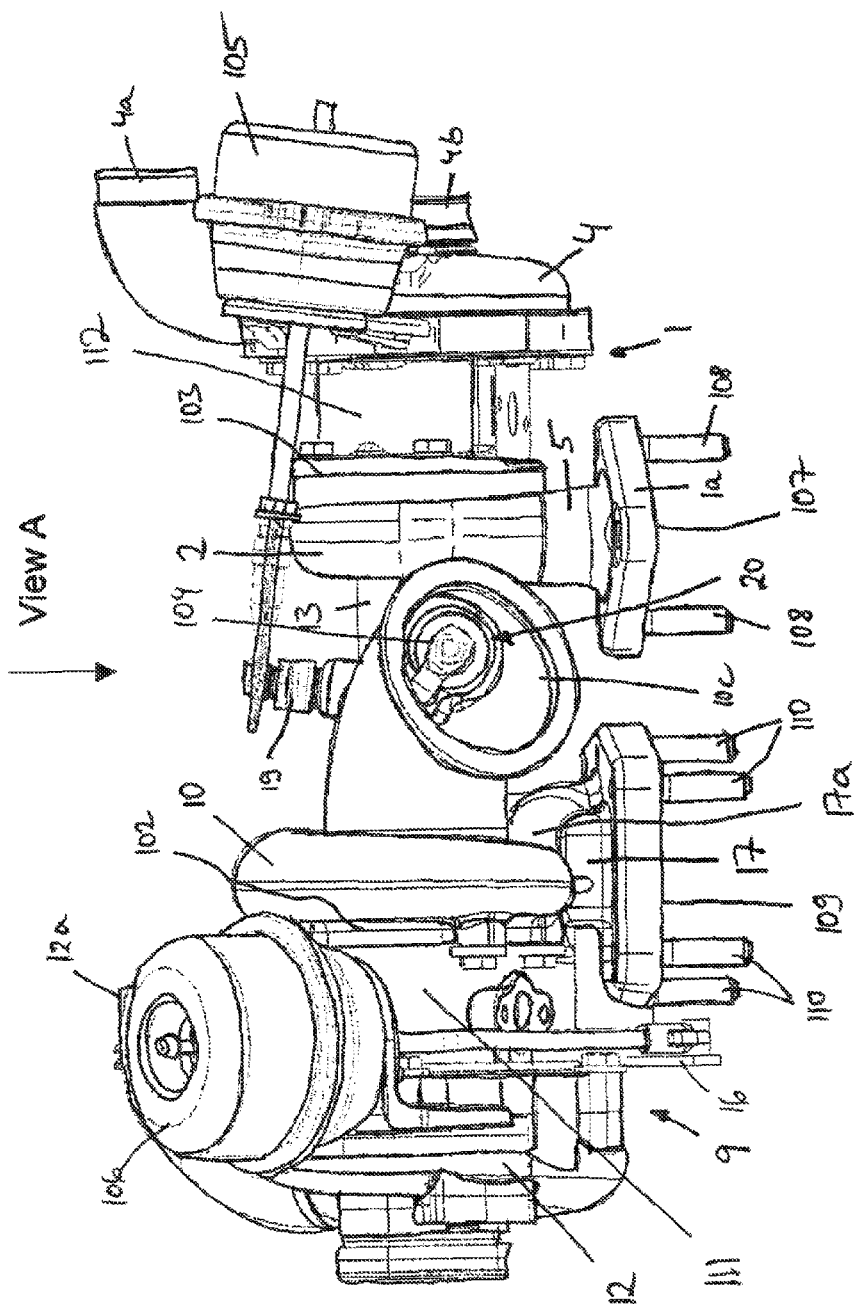
FIG. 2 is a spatial partial cross section view of the turbo-charger engine system of FIG. 1.
Figure 3:
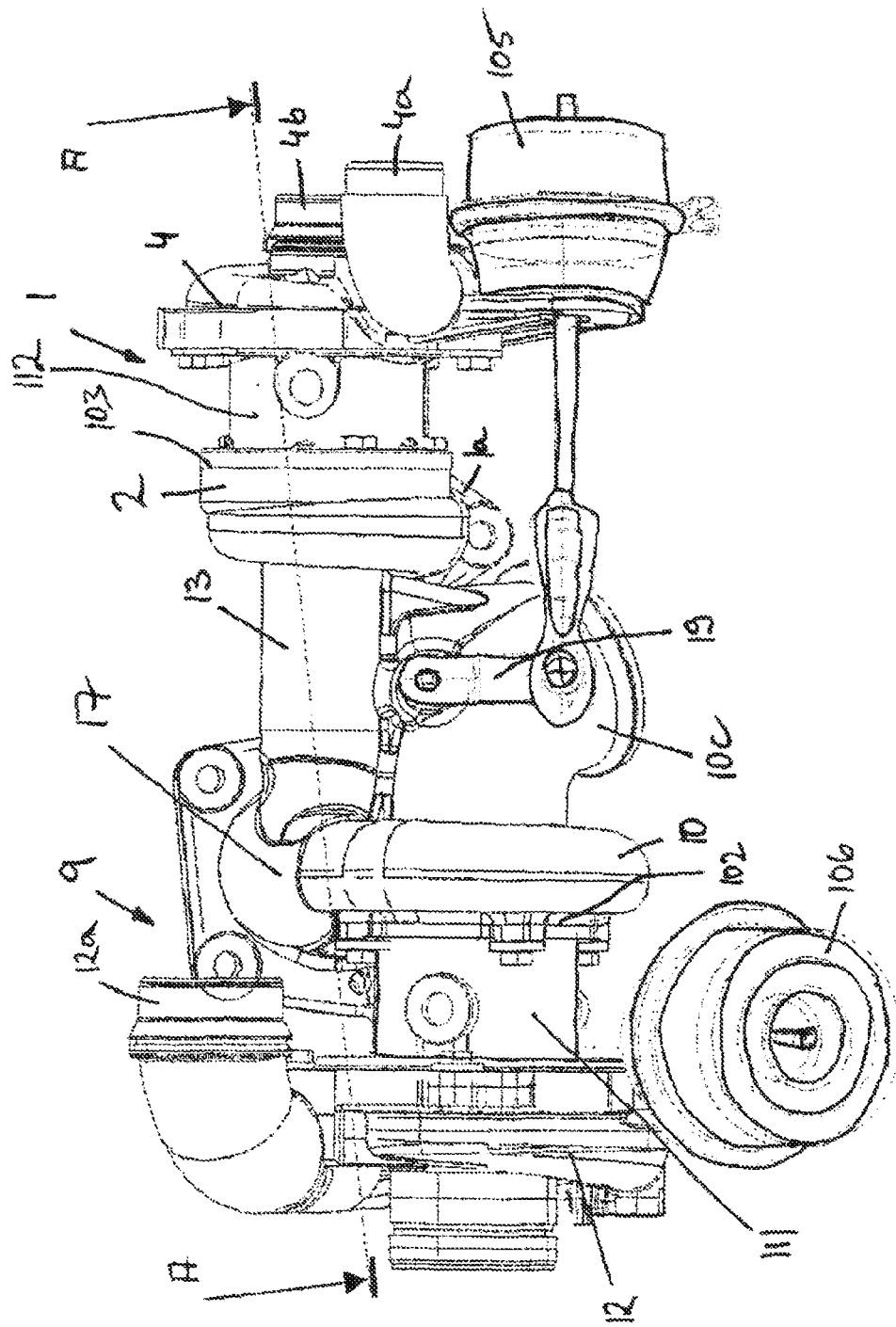
FIG. 3 is a spatial partial cross section view of the turbo-charger engine system of FIG. 1.
Figure 4:
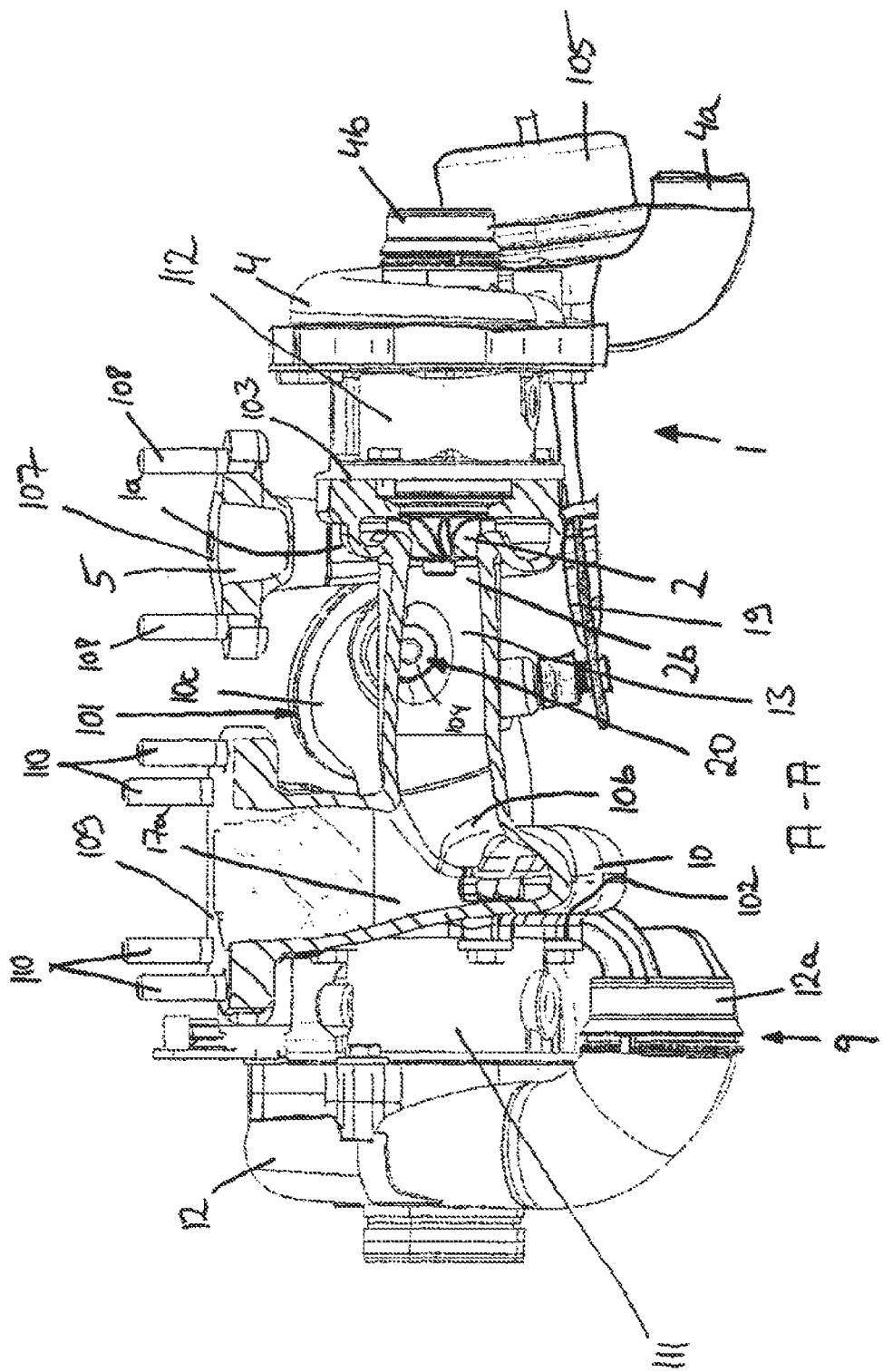
FIG. 4 is a further spatial partial cross section view of the turbo-charger engine system of FIG. 1.
Figure 5:
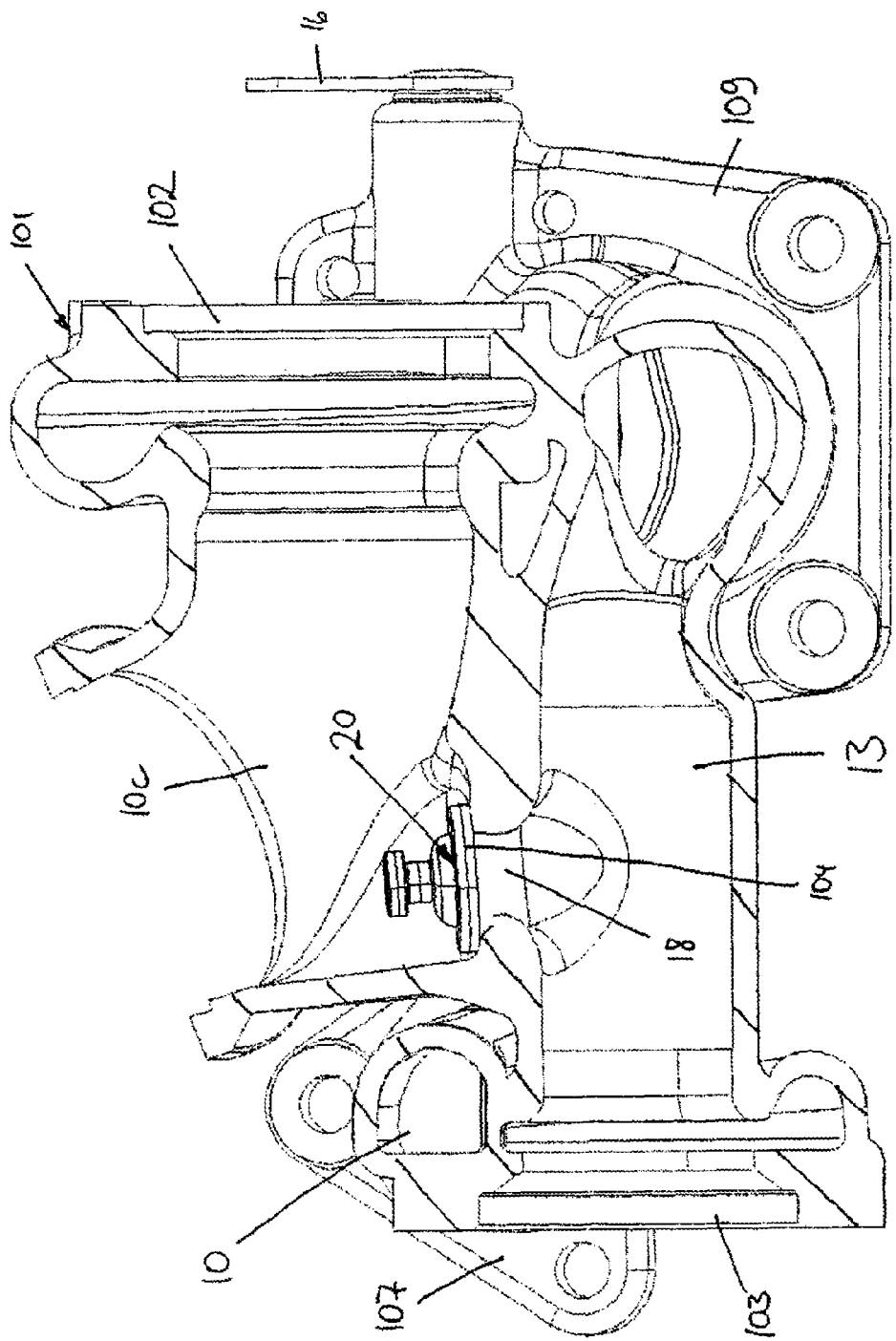
FIG. 5 is a spatial partial cross section view of a turbine housing of the turbo-charger engine system of FIG. 1.
Figure 6:
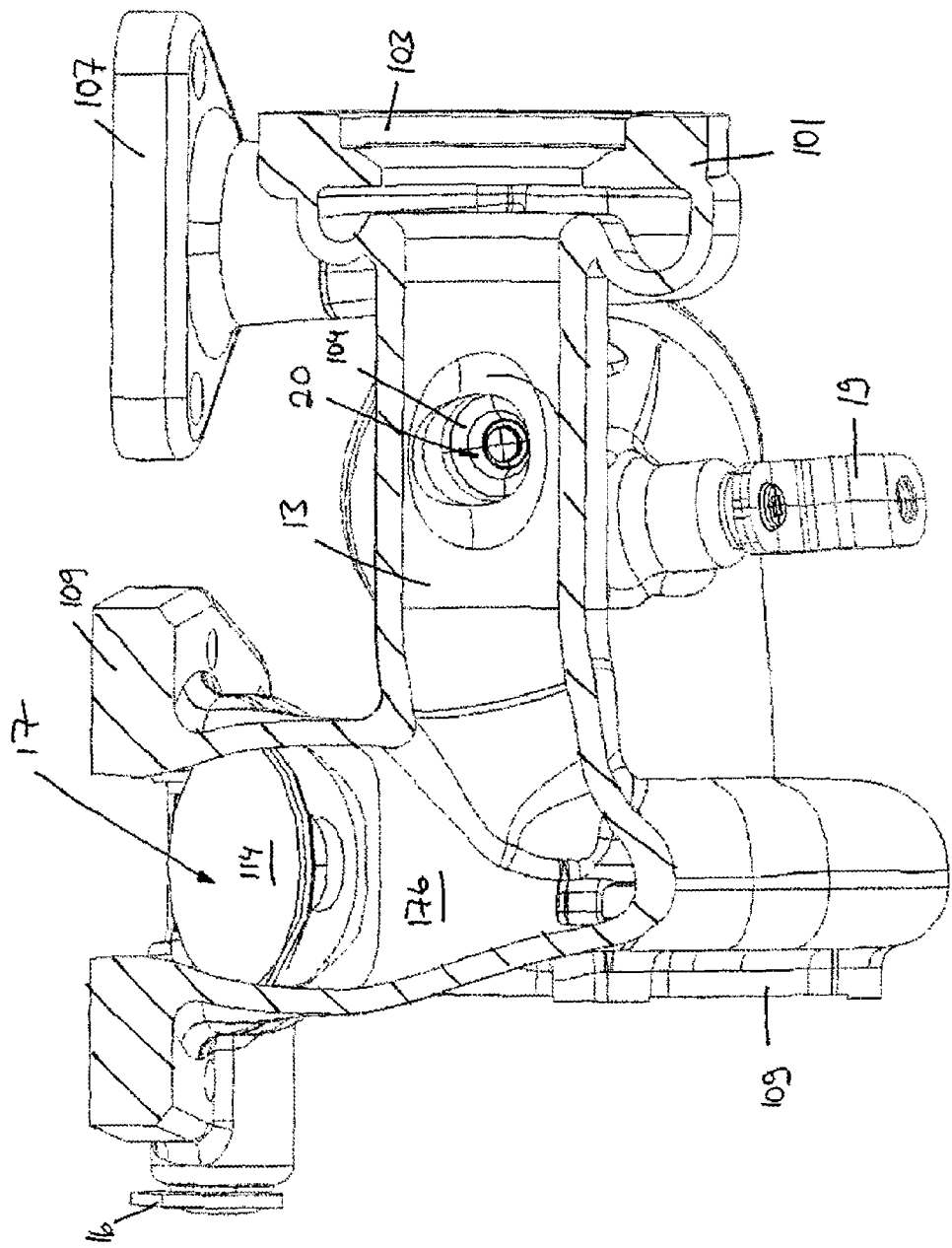
FIG. 6 is a further spatial partial cross section view of the turbine housing of FIG. 5.
Figure 7:
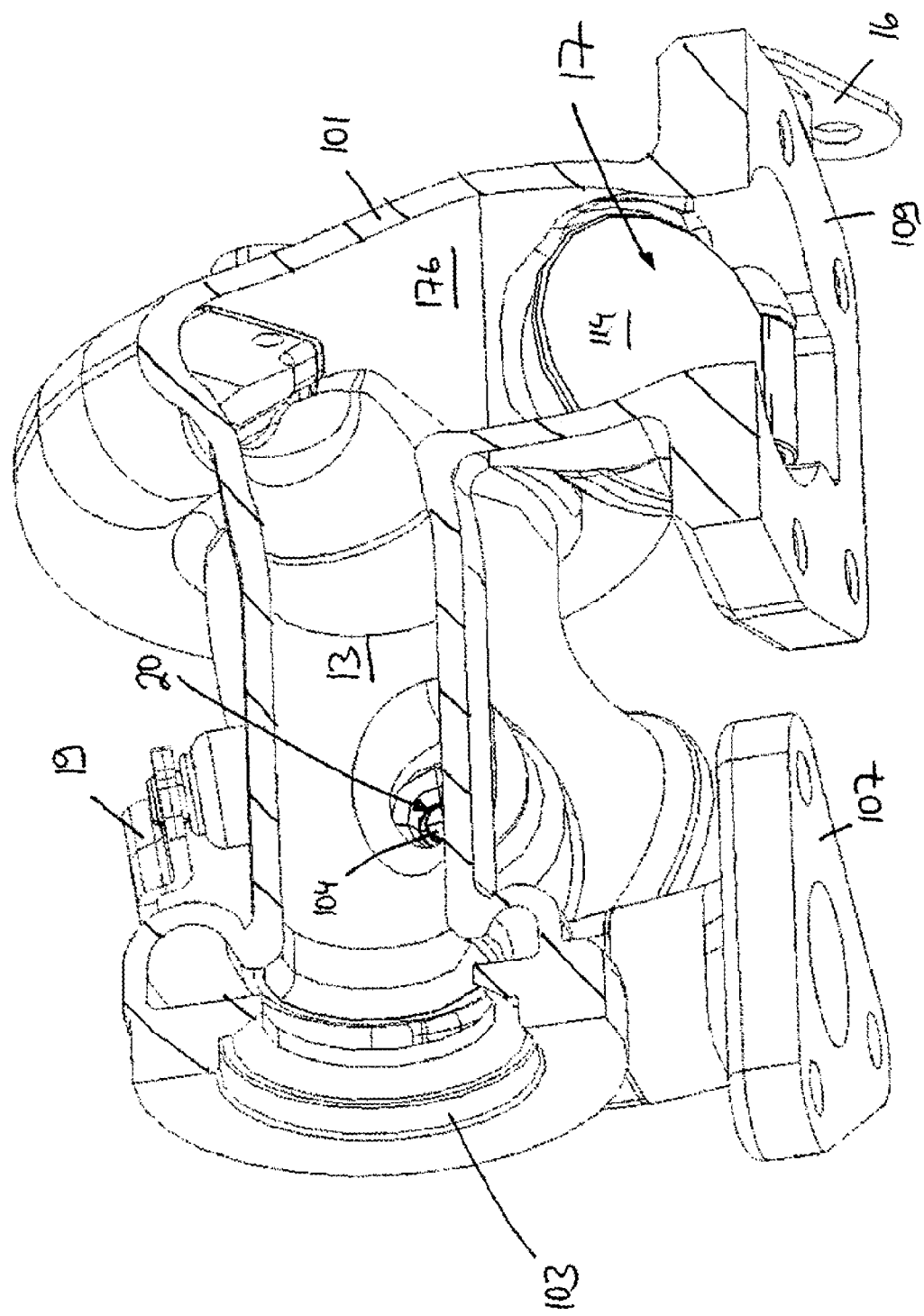
FIG. 7 is a further spatial partial cross section view of the turbine housing of FIG. 5.
Figure 8:
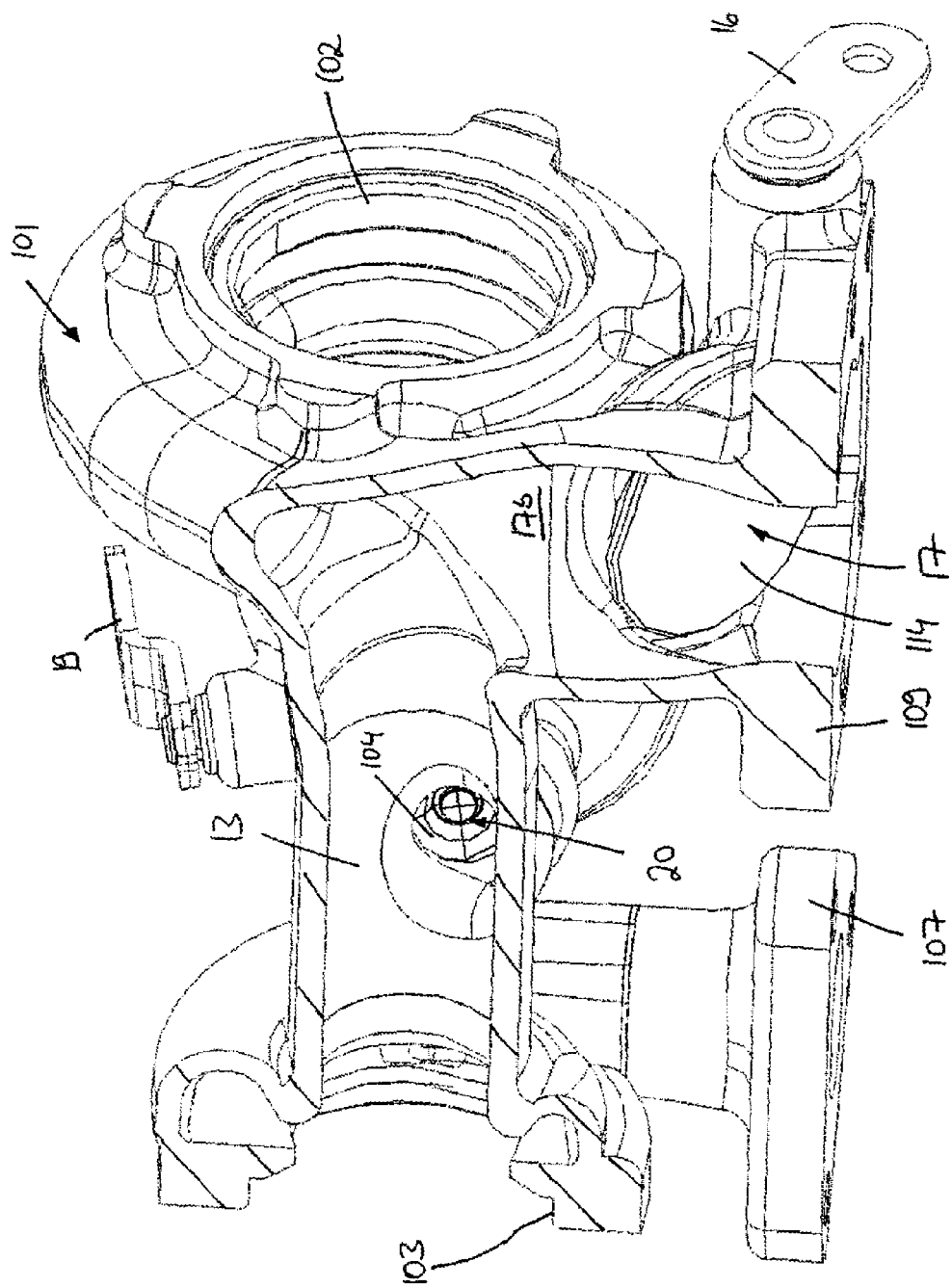
FIG. 8 is a further spatial partial cross section view of the turbine housing of FIG. 5.

As one can best see in FIG. 2-4, the turbo-charger engine system according to an embodiment of the invention comprises a turbine housing 101 which is provided as a single cast part and/or as a single casting, respectively.

The turbine housing 101 provides a low-pressure charger opening 102 for taking up or accommodating the low-pressure turbo-charger 9 and it provides a high-pressure charger opening 103 for taking up or accommodating the high-pressure turbo-charger 1. Low-pressure charger opening 102 provides a low-pressure turbocharger bearing housing interface to the low-pressure bearing house 111 and the high-pressure charger opening 103 provides a high-pressure turbocharger bearing housing interface to the high-pressure bearing house 112.

Low-pressure charger opening 102 and high-pressure charger opening 103 are communicating via the low-pressure exhaust pipe 13 which is comprised as a channel in the turbine housing 101. Low-pressure charger opening 102 and high-pressure charger opening 103 comprise bolt flanges, the connection planes of the bolt flanges being parallel to each other.

The waste gate valve 20 is implemented as a check valve with a vent flap 104, which can be best seen in FIG. 2. The waste gate valve 20 is driven and rotated, respectively, by an operating lever 19 which is actuated by a pulse width modulated pneumatic actuator 105 as can be best seen in FIG. 3.

The high-pressure turbine by-pass valve 17 is implemented as a check valve with a vent flap. The high-pressure turbine by-pass valve 17 is rotated by an operating lever 16 which is actuated by a pulse width modulated pneumatic actuator 106 as can be best seen in FIG. 3.

For the sake of clarity and simplicity, the charging bypass 21 and the check valve 22, which are actuated by a further pulse width modulated pneumatic actuator, are not shown in FIG. 2-4.

As can be best seen in FIG. 2 and in FIG. 4, the high-pressure exhaust pipe 5 ends in a high-pressure exhaust flange 107, which is connected to a corresponding flange at the exhaust manifold 6 using flange bolts 108. Similar to that, the short-cut pipe 17a ends in a short-cut exhaust flange 109 which is connected to a further corresponding flange at the exhaust manifold 6 using flange bolts 110.

The high-pressure exhaust flange 107 and the short-cut exhaust flange 109 lie in parallel planes and they are facing in the same direction.

The operation of the above embodiment will now described herein below.

In the turbo-charger engine system according to this invention, the charging, for example, at 700 rpm, is supplied by high-pressure turbo-charger 1 and a low pressure turbo-charger 9 disposed in series with and downstream of high-pressure turbo-charger 1. The high-pressure turbine by-pass valve 17, the waste gate valve 20 and the check valve 22 are closed in this state.

With increasing engine speed the flow capacity of the high pressure turbocharger will be limited, thereby limiting further performance to be obtained. It will also reach the maximum allowable turbo speed.

At that time, operating lever 16 opens high-pressure turbine by-pass valve 17 to thereby allow part of the exhaust gas flowing from exhaust manifold 6 through short-cut pipe 17b into low-pressure exhaust pipe 13. At that time, the flow and pressure within high-pressure exhaust pipe 5 energize the high-pressure turbo-charger 1 to thereby cause charging pressure to be produced. At the same time, the flow and pressure within low-pressure exhaust pipe 13 increases due to the flow and pressure from the short-cut pipe 17b and from the turbine outlet 2b to energize low-pressure turbo-charger 9, thus charging pressure will be produced. Therefore, the pressure within high-pressure charging pipe 14 can be adjusted such that it does not exceed the allowed limit.

When the engine arrives, for example, at 2000 rpm, the opening area of overflow valve 17 reaches a maximum, thus almost all of the exhaust gas flows through high-pressure exhaust bypass 15 into low-pressure exhaust pipe 13 to thereby lose the function of high-pressure turbo-charger 1 while energizing low pressure turbo-charger 9 to thereby produce a predetermined charging pressure. At that time, almost all the charging discharged to low-pressure charging pipe 14 flows through charging bypass 21 to open check valve 22 and flows into high-pressure charging pipe 7.

When the engine speed exceeds 2000 rpm and the low pressure turbocharger reaches its limit it has to be protected from over speed. Therefore, operating lever 19 opens waste gate valve 20. This maintains the highest allowable charging pressure of engine.

The required air quantity for the engine under partial load, for example at 6000 rpm, decreases. Under engine load or torque below a predetermined level, high-pressure turbine by-pass valve 17 is not fully open, and exhaust gas energizes high-pressure turbo-charger turbine 1 while flowing into low-pressure turbo-charger 9.

FIGS. 5 to 8 show spatial partial cross section views of the turbine housing 101 fitted with the valve flaps, axles and levers of the high-pressure turbine by-pass valve 17 and the turbine by-pass valve 20 resp. waste gate valve 20.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

The invention claimed is:

1. A turbine housing of a turbo-charger engine system for an internal combustion engine, the turbine housing comprising:
   a low-pressure charger opening attachable to a low-pressure turbo-charger;
   a high-pressure charger opening attachable to a high-pressure turbo-charger;
   a low-pressure exhaust duct in operable communication between the low-pressure charger opening and high-pressure charger opening;
   a high-pressure exhaust opening in operable communication via a high-pressure exhaust duct with the high-pressure charger opening, the high-pressure exhaust opening attachable to a corresponding flange at an exhaust manifold of the internal combustion engine;
   a short-cut exhaust opening in operable communication via a short-cut duct with the low-pressure charger opening, the short-cut exhaust opening being attachable to a corresponding flange at an exhaust manifold of the internal combustion engine;
   a high-pressure turbine by-pass valve area located in the short-cut duct;
   an external connection opening attachable to a muffler, the external connection opening in operable communication with the low-pressure charger opening, the external connection opening further in operable communication with the low-pressure exhaust duct via a low-pressure turbine exhaust bypass duct; and
   a waste gate valve area provided in the low-pressure turbine exhaust bypass duct,
   wherein a high-pressure exhaust flange and the short-cut exhaust flange are facing essentially in the same direction.

2. The turbine housing according to claim 1, wherein the low-pressure exhaust duct, the high-pressure exhaust duct, the short-cut duct or the low-pressure turbine exhaust bypass duct are provided as internal channels in the turbine housing.

3. The turbine housing according to claim 1, wherein the high-pressure exhaust flange and the short-cut exhaust flange lie in essentially parallel planes.

4. The turbine housing according to claim 3, wherein the high-pressure exhaust flange and the short-cut exhaust flange lie essentially in the same plane.

5. The turbine housing according to claim 1, wherein the low-pressure charger opening and the high-pressure charger opening lie in essentially parallel planes.

6. The turbine housing according to claim 1, wherein the waste gate valve area is accessible for at least one machining process from outside of the turbine housing.

7. The turbine housing according to claim 6, wherein the waste gate valve area is located in a vicinity of the external connection opening such that it is accessible for the at least one machining process through the external connection opening.

8. A high-pressure turbo-charger of a turbo-charger engine system for an internal combustion engine, the high-pressure turbo-charger comprising:
   a turbine housing, comprising:
      a low-pressure charger opening;
      a high-pressure charger opening;
      a low-pressure exhaust duct in operable communication between the low-pressure charger opening and high-pressure charger opening;
      a high-pressure exhaust opening in operable communication via a high-pressure exhaust duct with the high-pressure charger opening, the high-pressure exhaust opening attachable to a corresponding flange at an exhaust manifold of the internal combustion engine;
      a short-cut exhaust opening in operable communication via a short-cut duct with the low-pressure charger opening, the short-cut exhaust opening being attachable to a corresponding flange at an exhaust manifold of the internal combustion engine;
      a high-pressure turbine by-pass valve area located in the short-cut duct;
      an external connection opening attachable to a muffler, the external connection opening in operable communication with the low-pressure charger opening, the external connection opening further in operable communication with the low-pressure exhaust duct via a low-pressure turbine exhaust bypass duct; and
      a waste gate valve area provided in the low-pressure turbine exhaust bypass duct, wherein the high-pressure exhaust flange and the short-cut exhaust flange are facing essentially in the same direction;

a low-pressure turbo-charger with a low-pressure turbine wheel located in the low-pressure charger opening, the low-pressure turbo-charger in communication with the low-pressure charger opening; and the high-pressure turbo-charger with a high-pressure turbine wheel located in the high-pressure charger opening, the high-pressure turbo-charger in communication with the high-pressure charger opening, and the low-pressure turbine wheel and the high-pressure turbine wheel essentially facing towards each other.

9. The high-pressure turbo-charger according to claim 8, wherein the high-pressure turbine by-pass valve area or the waste gate valve area comprise a movable flap.

10. The high-pressure turbo-charger according to claim 9, further comprising a pulse-width modulated pneumatic actuator coupled with the movable flap for moving the movable flap between an open and a closed position.

\* \* \* \* \*